United States Patent

Jones

[11] 4,302,050
[45] Nov. 24, 1981

[54] TRUCK HOIST

[76] Inventor: Eldon D. Jones, R.R. 2,, Lake Crystal, Minn. 56055

[21] Appl. No.: 85,557

[22] Filed: Oct. 17, 1979

[51] Int. Cl.³ .............................................. B60P 1/20
[52] U.S. Cl. ................... 298/22 J; 254/9 C
[58] Field of Search .............. 298/19 B, 22 R, 22 B, 298/22 D, 22 J; 254/3 C, 9 C

[56] References Cited

U.S. PATENT DOCUMENTS

| Re. 26,455 | 9/1968 | Jones | 298/22 J |
| 2,611,642 | 9/1952 | Gwinn | 298/22 D |
| 2,836,460 | 5/1958 | Lundell | 298/22 J |
| 3,791,695 | 2/1974 | Seniuk | 298/22 J |

FOREIGN PATENT DOCUMENTS

| 722518 | 11/1965 | Canada | 298/22 J |
| 1414976 | 9/1965 | France | 298/22 D |

OTHER PUBLICATIONS

Galion Models U-730, U-730DA; Peabody Galion Corp.; Galion, Ohio; 1974.

Crysteel Hoist, Models 445, 655, & ST-560; Crysteel Mfg., Inc.; Lake Crystal, Minn.

Primary Examiner—Leslie J. Paperner
Attorney, Agent, or Firm—Geoffrey R. Myers

[57] ABSTRACT

A hoist mechanism that more effectively uses its hydraulic capacity is comprised of a first and a second pair of lifting arms connected at a first pivot point, a hydraulic cylinder connected to said lifting arms, and a pivoting stop means that coordinates movement of the two pair of lift arms. During the initial lifting action of the hoist, the mechanism achieves the advantages of a double arm type hoist by causing the first pair of lifting arms to remain stationary while the second pair of lifting arms rotates around the first pivot point. After the second pair of lift arms reach a predetermined angle with the stationary first pair, the stop means are engaged in a way to cause both pair of lift arms to move upon further lifting action of the hoist, thus achieving the advantages of a scissors type hoist from this point on.

20 Claims, 11 Drawing Figures

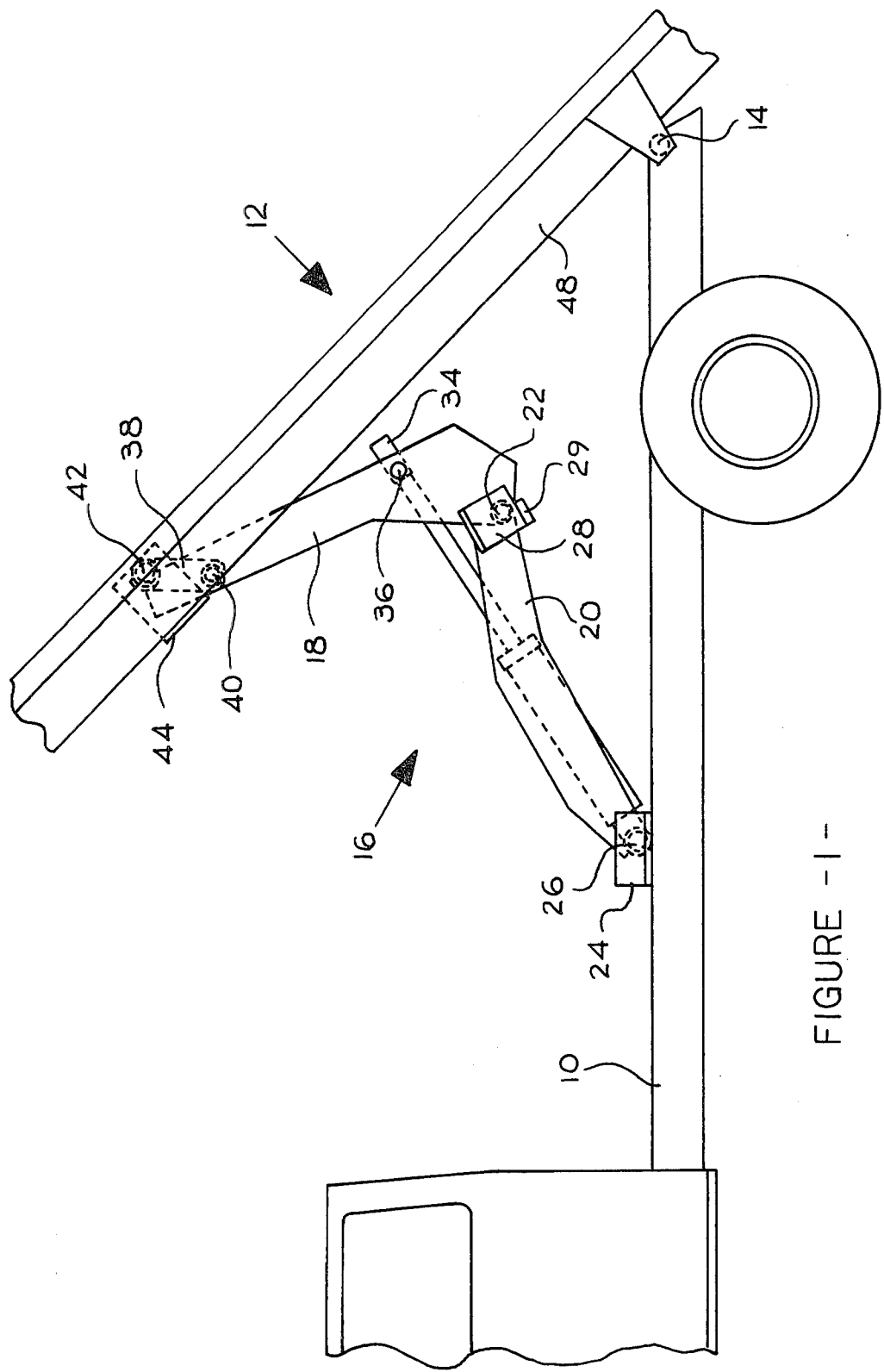
FIGURE -1-

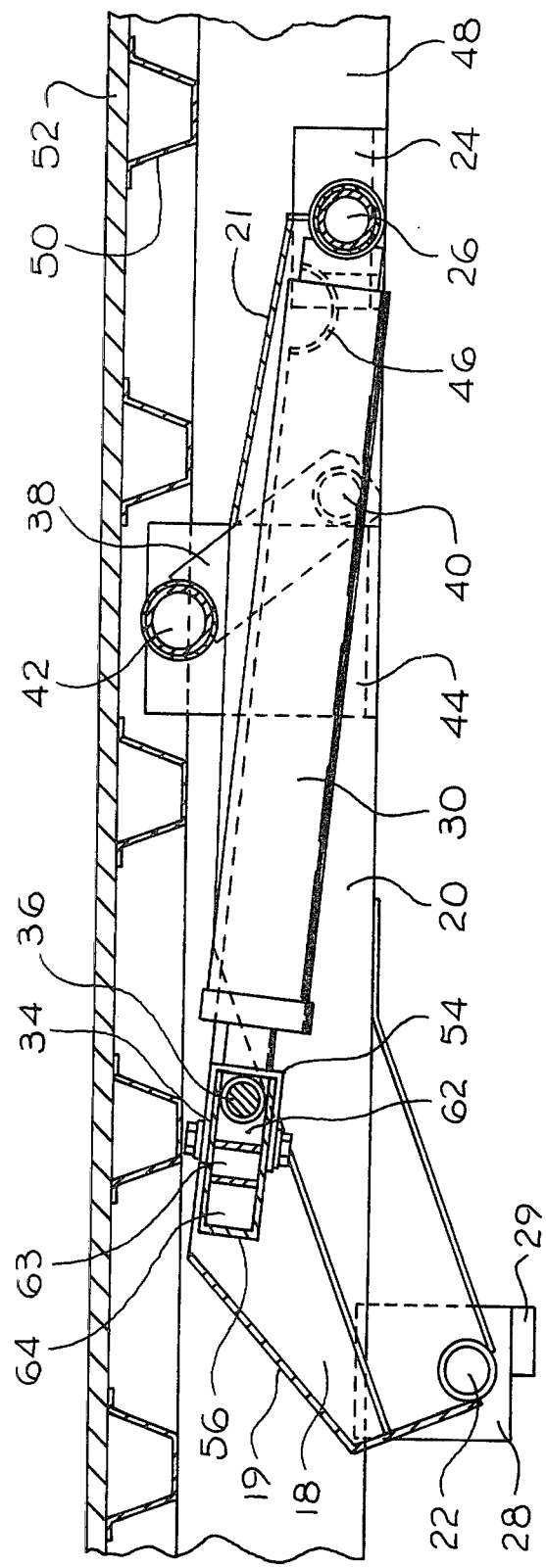
FIGURE -2-

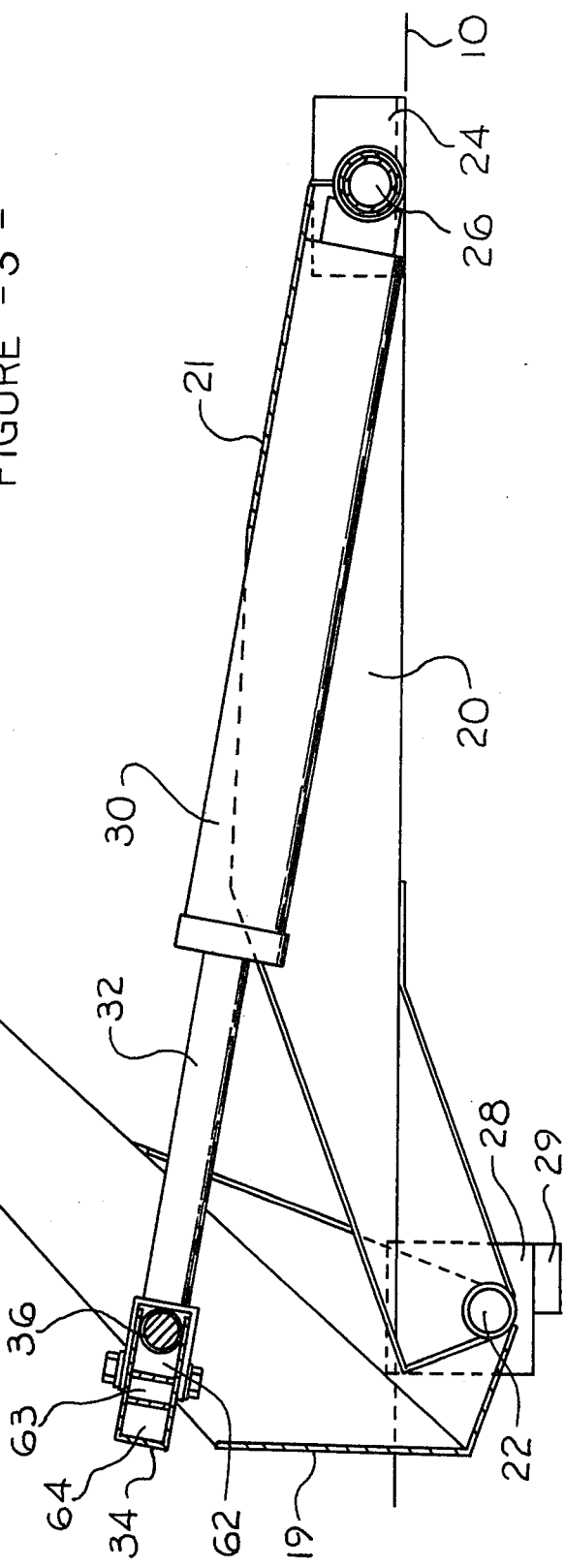
FIGURE - 3 -

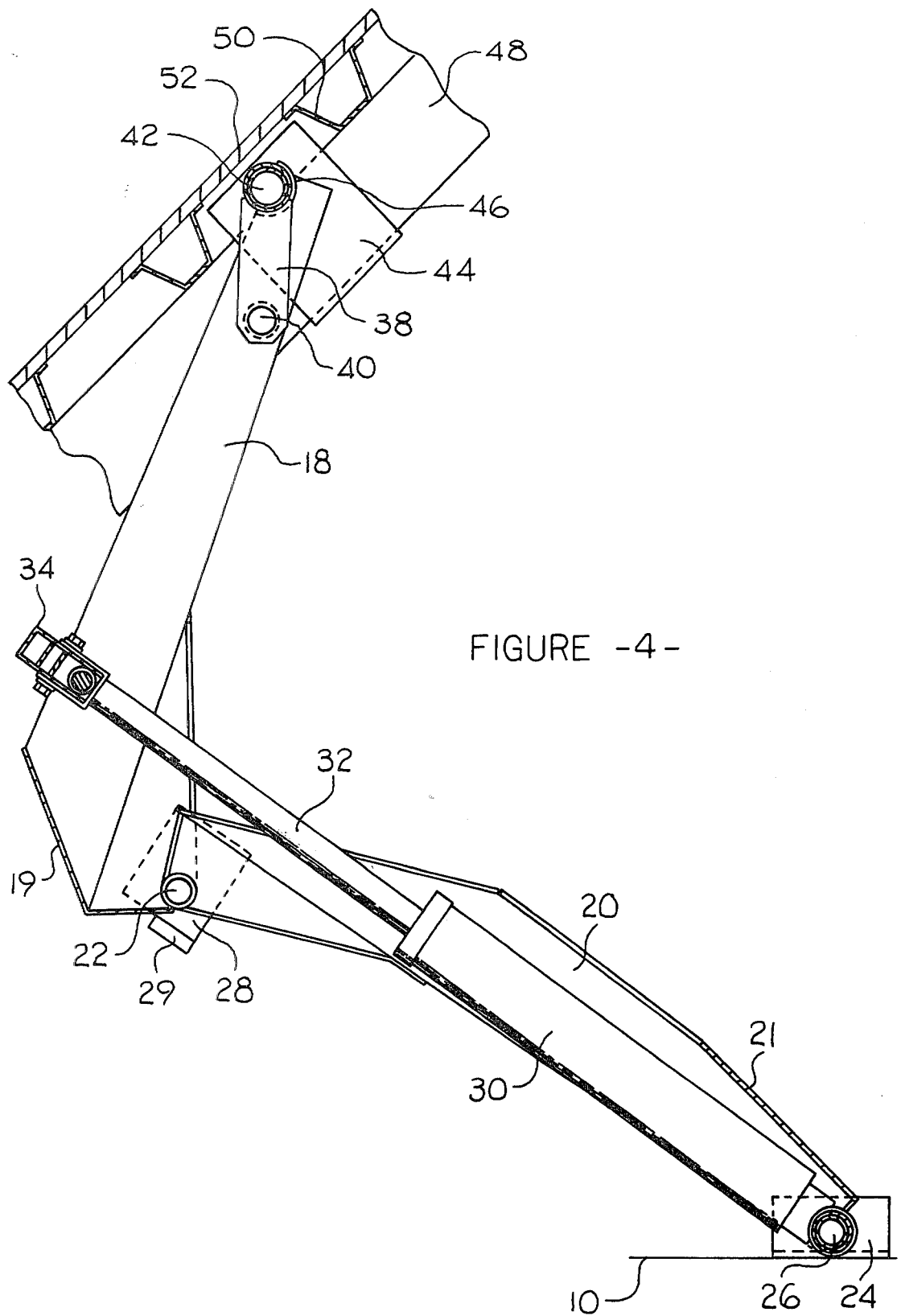
FIGURE -4-

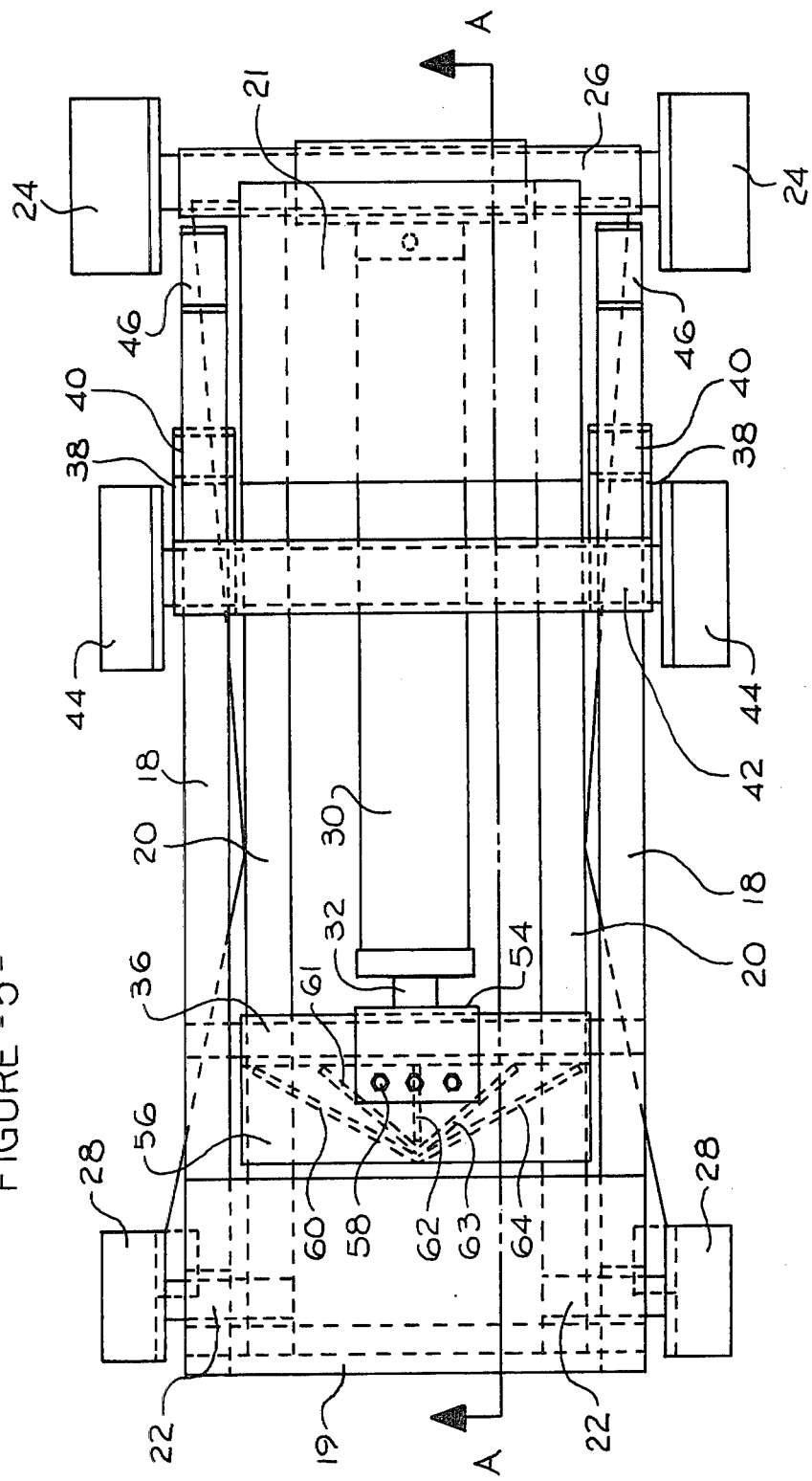

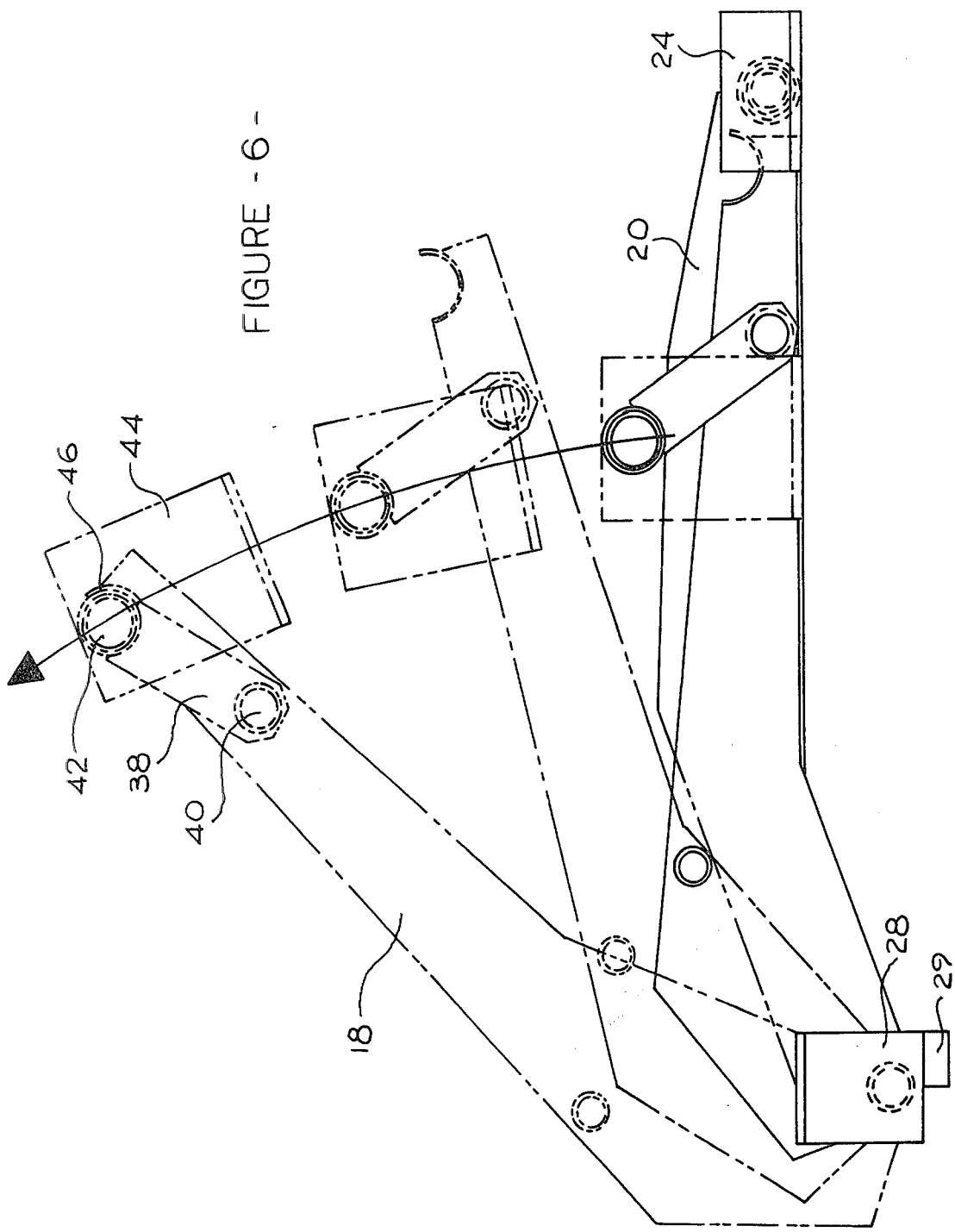

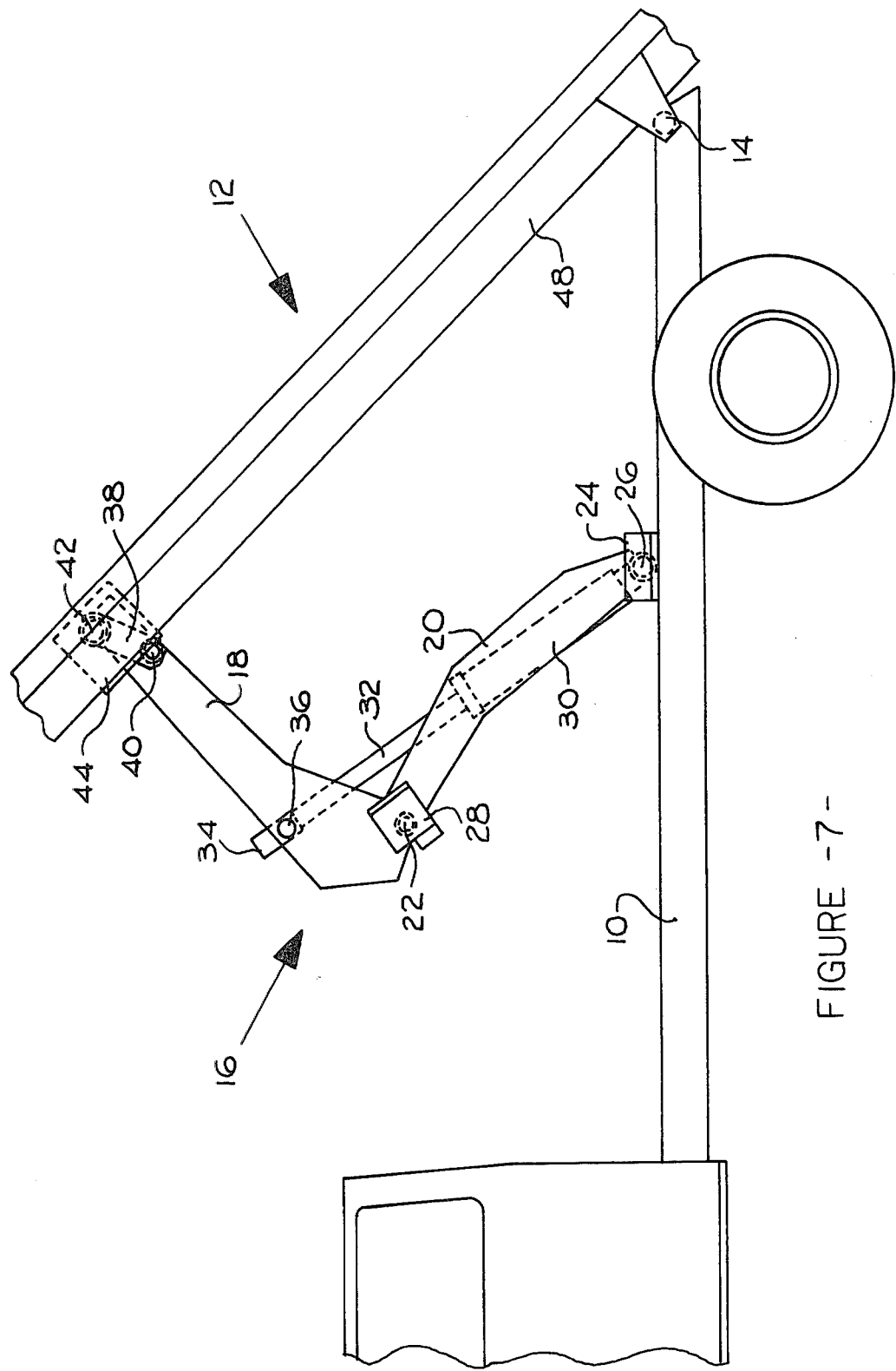

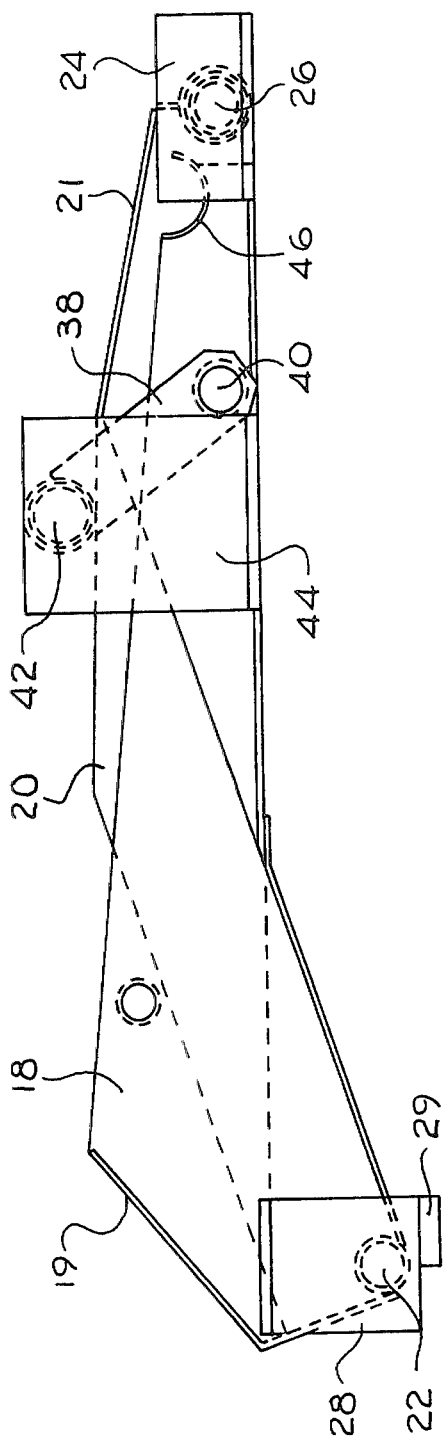
FIGURE -8-
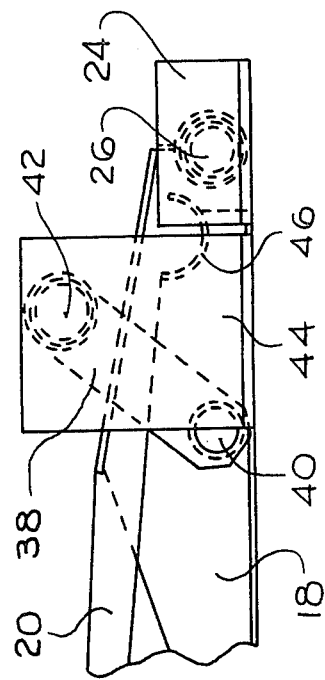
FIGURE -10-
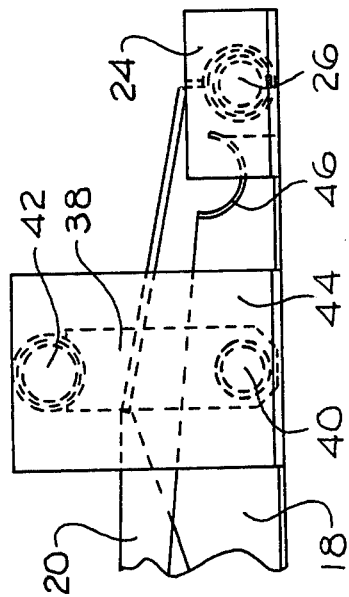
FIGURE -9-

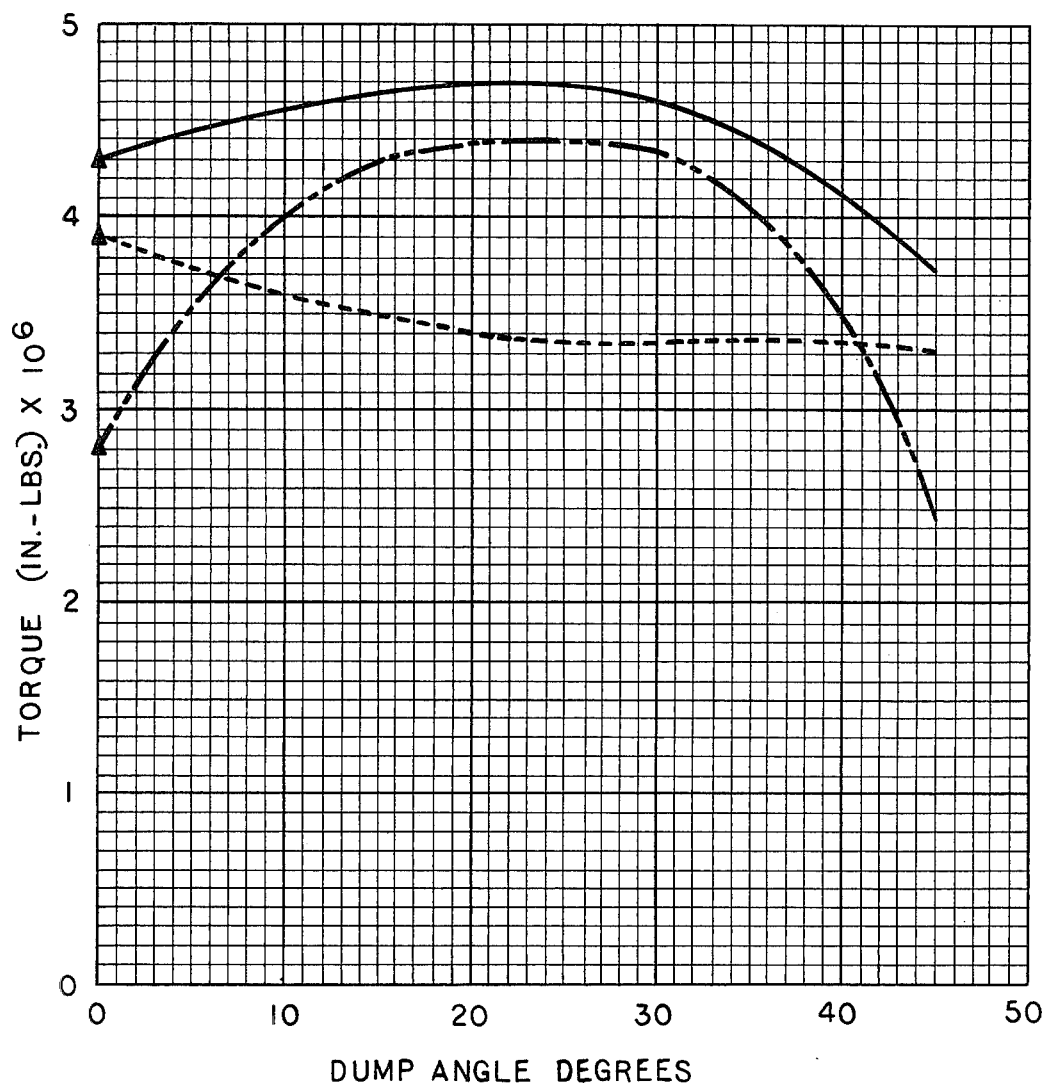
FIGURE -11-
BREAKAWAY POINT ▲
CURVE A  ----------
CURVE B  — — — —
CURVE C  ————————

TRUCK HOIST

This invention relates to hoists for dump trucks and other similar vehicles. In particular, this invention provides a dump body hoist that uses its hydraulic capacity with increased effectiveness.

Dump body trucks (e.g., construction, farm, etc.) are widely used throughout industry and come in a wide variety of types. Generally, they include a dump bed or body pivotally connected to a vehicle chassis and operable by a hydraulic hoist mechanism extending between the bed and the chassis. Two of the most popular types of hoists currently used are double-arm hoists and scissors hoists. Each of these has its respective advantages as well as its disadvantages. Some of these advantages and disadvantages are illustrated by the power curve graphs, in FIG. 11, that are used by the well known National Truck Equipment Association (Detroit, Mich.) to classify truck hoists.

In compiling the graphs, substantially the same size hydraulic cylinder was used for each type of hoist. The terminology is as follows on the graphs: "dump angle degrees" is the angle between the chassis and the truck bed; "torque" is the power being applied to the truck bed and its payload; and "breakaway point" is defined as the point at which the truck bed first lifts off the chassis.

The double-arm hoist, as shown in FIG. 11 by the power curve A, has the advantage over the scissors hoist of providing a relatively high torque at the breakaway point. However, as further illustrated by this same curve, the double-arm hoist has the disadvantage that as the dump angle increases, available torque that the hoist can apply on the truck bed and its payload decreases. Another disadvantage of the double-arm hoist is that it must be located further towards the back of the truck chassis than the scissors hoist in order for its hydraulic cylinder arm to push the truck bed to its maximum dump angle desired. By placing the cylinder near the back of the truck excessive stress is placed on the rear hinge and the hoist operation is less efficient.

As shown in power curve B of FIG. 11, a scissors hoist of comparable size has an opposite advantage and disadvantage. For example, the scissors hoist provides a relatively low torque at the breakaway point. On the other hand, the available torque increases as the dump angle increases, up to a certain dump angle. Another advantage of a scissors type hoist is that it can be located on the chassis further towards the front of the truck than the double-arm hoist, thus, avoiding undue stress on the dump bed pivot connection.

It is apparent from the above that there exists a need in the art for a hoist which could optimize the advantages of these two prior art hoists and at the same time mitigate their disadvantages. It is a purpose of this invention to fulfill this and other needs more apparent to the skilled artisan once given the following disclosure:

The dump body hoists contemplated by this invention operate by successfully combining the advantageous features of the above-described prior art hoists thereby to achieve a lifting capacity that is greater than the prior art hoists of a similar size, over the range of dumping angles from 0°–45°, while at the same time eliminating or diminishing their disadvantages. In this respect, the hoists contemplated by this invention have an initial lifting action similar to the advantageous initial lifting action of the double-arm hoist during the phase of the lifting from the breakaway point to the point at which the truck bed is at a predetermined angle with the chassis. At that point, the lifting action is switched to the advantageous later lifting action of a scissors type hoist. The choice of the switch over point (or "switching angle") can be easily varied in the practice of this invention to meet any particular situation. Generally the predetermined angle between the truck bed and the chassis most often chosen will be the angle at which a scissors type action would be more efficient or advantageous than a double-arm type action for that particular hoist configuration.

Thus, a hoist contemplated by this invention has the advantage of the double-arm hoist of a relatively large available breakaway torque, and also has the advantages of the scissors type hoist in that the available torque increases as the dump angle increases, up to a certain dump angle, and also that the hoist can be located further forward on the chassis. Furthermore, since the new hoist mechanism can be located further forward on the chassis than a double-arm hoist, this makes it more efficient during the first stage of the lift when it acts as a double-arm hoist, than a double-arm hoist of the same size, while at the same time placing less stress on the pivot hinge between the bed and chassis.

Generally speaking the hoist mechanisms contemplated by this invention are used for raising and lowering a dump bed pivotally connected to a vehicle chassis and comprise:

a first and a second lifting arm connected at a first pivot point, said first lifting arm having a second pivot point at one end thereof, said second lifting arm having a pivoting stop means located on one end thereof; and an extensible and retractable hydraulic cylinder means connected to said second lifting arm;

said hydraulic cylinder means and said pivoting stop means being so arranged that upon initial extension of said cylinder means, said first lifting arm remains stationary relative to said second pivot point as said second lifting arm rotates around said first pivot point until said second lifting arm reaches a predetermined angle with respect to said first lifting arm, said pivoting stop means being so located that when said second lifting arm exceeds said predetermined angle said pivoting stop means causes said first lifting arm to rotate around said second pivot point upon further extension of said hydraulic cylinder means.

This invention will now be described with respect to certain embodiments thereof as illustrated in the accompanying drawings, wherein:

IN THE DRAWINGS

FIG. 1 is a side plan view of an embodiment of this invention, wherein the dump bed is in its elevated position.

FIG. 2 is a side plan view of the embodiment of FIG. 1, partially sectionalized along A—A of FIG. 5, wherein the bed is resting on the chassis.

FIG. 3 is a side plan view, partially sectionalized along line A—A of FIG. 5, of the hoist assembly when the hoist assembly is at the switching angle.

FIG. 4 is a side plan view, partially sectionalized along line A—A of FIG. 5, of the hoist assembly, fully extended.

FIG. 5 is a top view of the hoist assembly in the resting position.

FIG. 6 is a schematic view showing the movement of the upper arm, lift link, and the bracket connecting the lift link to the truck bed as the upper arm rotates during the first stage of the lifting operation.

FIG. 7 is a side plan view of another embodiment of this invention wherein the hydraulic cylinder arm extends toward the front of the truck.

FIGS. 8-10 are partial side plan views showing possible configurations of the lift link that would result in the hoist means, as contemplated by this invention, having different switching angles.

FIG. 11 shows the National Truck Equipment Association power curves for a typical prior art double-arm hoist, prior art scissors hoist, and a hoist contemplated by this invention, all of substantially comparable size.

Referring to the accompanying drawings and in particular the embodiment of FIG. 1, there is illustrated a typical truck chassis 10 and a dump bed 12 hinged together at the back of the truck by rear hinge 14. Rear hinge 14 is, therefore, the pivot point for dump bed 12. Dump bed 12 is comprised of body longbeams 48, crossmembers 50, and floor 52.

Hoist assembly 16 has two pairs of arms; upper arms 18 and lower arms 20. Upper arms plate 19, having an L-shaped cross-section, is attached to the top and edge of upper arms 18 so that upper arms 18 move simultaneously. Lower arms plate 21, also having an L-shaped cross-section, is attached to lower arms 20 so that they move simultaneously. Upper arms 18 and lower arms 20 are slightly L-shaped so that hoist assembly 16 can assume a low profile. Upper arms 18 and lower arms 20 are hinged together by arm pivoting crosstube 22. Therefore, arm pivoting crosstube 22 represents the pivot point for upper arms 18 when they rotate with respect to lower arms 20.

Hoist assembly 16 is rotatably connected to chassis 10 by chassis brackets 24 and chassis pivoting crosstube 26. Chassis pivoting crosstube 26 passes through lower arms 20 and chassis bracket 24. Thus, chassis pivoting crosstube 26 represents the pivoting point for lower arms 20.

Arm brackets 28 are located on arm pivoting crosstube 22 outside of lower arms 20 and upper arms 18. Arm brackets 28 rest on chassis 10 until dump bed 12 reaches the switching angle. Arm brackets 28 have hoist guides 29 that extend downward at a 45° angle with the bottom of arm brackets 28. Hoist guides 29 slope inward at a 45° angle so that hoist assembly 16 is guided into its proper location on chassis 10 when hoist assembly 16 is returned to the rest position after being extended.

Hoist assembly 16 also has an extensible and retractable hydraulic cylinder 30 of a known type such as one commonly employed in a conventional scissors hoist. Hydraulic cylinder 30 has one end thereof rotatably attached to chassis pivoting crosstube 26, and at the other end, has protruding therefrom extendible rod 32. Crosshead member 34 is attached to extendible rod 32 on the opposite end of extendible rod 32 from hydraulic cylinder 30. Crosshead member 34 is rotatably attached to upper arms 18 by crosshead pivoting crosstube 36.

Crosshead member 34 is made up of plate 54, plate 56, bracing members 60, 61, 62, 63 and 64, and screws 58. Plates 54 and 56 are of a U-shaped cross-section and are fastened together by screws 58 such that an open-ended box with four walls is formed by plates 54 and 56. The surface of plate 54 at the bottom of the U is fixably attached, in this embodiment by welding, to extendible rod 32. Bracing members 60, 61, 62, 63 and 64 are located inside plates 54 and 56 and run from the bottom wall of the U of plate 56 to crosshead pivoting crosstube 36. Crosshead member 34 has the function of distributing the force to be applied by extendible rod 32 evenly over the length of crosstube 36 so that crosstube 36 has a higher resistance to bending forces.

Upper arms 18 are attached to dump bed 12 by a pivoting stop means comprised of lift links 38, lift link pivot tubes 40, saddles 46 at the extended end of upper arms 18, dump bed crosstube 42, and dump bed brackets 44. Lift links 38 are elongated members having one end rotatably attached to lift link pivot tubes 40 and the other end engagable with dump bed crosstube 42. Lift link pivot tubes 40 also are attached to upper arms 18. Dump bed crosstube 42 is rotatably attached to dump bed 12 by dump bed brackets 44 which engage dump bed crosstube 42 and are fixably attached to dump bed 12. Dump bed brackets 42 rest upon chassis 10 when hoist assembly 16 is in its lowermost position. Therefore, lift link pivot tubes 40 represent the pivot point for lift links 38 with respect to upper arms 18 until the "switching angle" is reached. Dump bed crosstube 42 is the pivoting point for the entire hoist assembly 16 with respect to dump bed 12.

In order to provide a pivotal stop means for switching the operation of the hoist from one where only arms 18 move to where a scissor hoist action is commenced by movement of both arms 18 and heretofore stationary arms 20, upper arms 18 are provided with saddles 46 therein of a size and shape such that saddles 46 engage dump bed crosstube 42 when dump bed 12 is raised to an angle equal to the desired "switching angle". In the embodiment illustrated in FIG. 1, the saddles are of an arc with a radius the same as the exterior wall of dump bed crosstube 42. The preferred "switching angle" is usually assumed for most conventional dump truck operations when the dump bed is raised about 20° with respect to the chassis frame.

The illustrated hoist operates as follows. When hoist assembly 16 is in the rest position as shown in FIG. 2, dump bed brackets 44 and arm brackets 28 rest on chassis 10 and help support dump bed 12 and its payload.

When hydraulic cylinder 30 is extended and exerts enough pressure to lift dump bed 12 off chassis 10, extendible rods 32 push on upper arms 18 at crosshead pivoting crosstube 36, causing upper arms 18 to rotate around their pivot point, arm pivoting crosstube 22. Lower arms 20 remain stationary and arm brackets 28 remain in contact with chassis 10 during the initial lifting. Lift links 38 and truck bed brackets 44 begin to move in their respective rotational pattern as illustrated in FIG. 6. Hydraulic cylinder 30, due to the rotation of upper arms 18, rotates around chassis pivoting crosstube 26. Similarly, dump bed 12 rotates around rear hinge 14. During this initial lifting action, hoist assembly 16 is acting like a double arm hoist. Thus, it has the advantage of the double arm hoist of relatively high breakaway torque as shown in FIG. 11.

The elements of hoist assembly 16 continue the above movements until the "switching angle" is reached. During this movement, the moment arms are as follows. The moment arm for the hydraulic force is the distance between parallel lines through crosstube 22 and crosshead pivoting crosstube 36 parallel to the longitudinal axis of hydraulic cylinder 30. The moment arm for the weight force exerted by the truck bed and its payload is the distance between arm pivoting crosstube 22 and lift link pivot tubes 40. Thus, the moment arm of the weight force is relatively short during the initial lifting of the dump bed, maximizing the available torque that can be applied by hoist assembly 16 to dump bed 12 and its payload.

As stated above, hoist assembly 16 during this part of the lifting action has acted as a double-arm hoist. However, a change in the lifting action occurs when hoist assembly 16 reaches the "switching angle". This change, described below, switches the lifting action of the hoist assembly 16 to that like a scissors type hoist. The "switching angle" may vary with each type of hoist configuration and size. This angle is usually chosen to be that angle at which the scissors type hoist would be the most efficient, which would be at the point where a line drawn from arm pivoting crosstube 22 to crosshead pivoting crosstube 36 is at 90° to the longitudinal axis of hydraulic cylinder 30. This would determine the optimum "switching angle". Typically, this angle will be about 20° (i.e., chassis to bed angle).

When dump bed 12 reaches the "switching angle", saddles 46 engage dump bed crosstube 42 as shown in FIG. 3. This changes the pivot point at which the weight of dump bed 12 and its payload is exerted to dump bed crosstube 42 from lift link pivot tubes 40. Moreover, this changes the moment arm of the weight of dump bed 12 to the distance between arm pivoting crosstube 22 and dump bed crosstube 42.

When hydraulic cylinder 30 exerts enough force to push dump bed 12 beyond the switching angle, upper arms 18 continue to rotate around arm pivoting crosstubes 22 with respect to lower arms 20, and lower arms 20 rotate around chassis pivoting crosstube 26 while arm brackets 28 are lifted off chassis 10. During this time, hydraulic cylinder 30 continues to rotate around chassis pivoting crosstube 26 and lift links 38 remain stationary with respect to upper arms 18. The elements continue this movement, which is similar to the lifting action of a scissors hoist, until the maximum desired dump angle is reached.

During the lifting action of hoist assembly 16 above the "switching angle", the lifting action is like that of the prior art scissors hoist. As can be seen from FIG. 11, this incorporates the advantage of the scissors hoist of an increasing available torque as the dump angle increases. As shown in FIG. 11, this new hoist design has combined the advantages of two prior art hoists described above while mitigating, to the extent desired, their disadvantages. Moreover, since the new hoist assembly is located further towards the front of the chassis than a similarly sized double-arm hoist usually is, the stress on the rear hinge during operation of the new hoist assembly is lower than that of a double-arm hoist.

It is not intended that this invention be limited to the embodiment as described above and shown in FIG. 1. For example, another embodiment within the scope of this invention is illustrated in FIG. 7. Note that in this embodiment, extendible rod 32 points towards the front, instead of the back, of the truck, and that hydraulic cylinder 30 rotates clockwise, not counterclockwise. The relative movement of the other elements of hoist assembly 16 is the same as in the embodiment described above except that the rotational directions are reversed.

In other embodiments, hoist assembly 16 could be turned upside down such that hydraulic cylinder 30 would be rotatably attached to dump bed 12 and lift links 38 would be attached to chassis 10. Also, more than one hydraulic cylinder may be used for added lifting power. Furthermore, the hydraulic cylinder(s) could be rotatably attached to the dump bed or the chassis by means independent of the other elements of the hoist assembly.

FIGS. 9 and 10 show further possible modifications useful in varying the type of stop means employed. In FIG. 9, lift link pivot tubes 40 are directly under dump bed crosstube 42 when hoist assembly 16 is in the rest position. This arrangement will result in a hoist assembly incorporating this arrangement having a smaller "switching angle" than a hoist assembly of the embodiment described above having a configuration as shown in FIG. 8. In FIG. 10, lift link pivot tubes 40 and dump bed crosstube 42 are arranged in the rest position such that lift links 38 are at an acute angle with a line from lift link pivot tubes 40 and chassis pivoting crosstube 26. This configuration results in a hoist assembly with this configuration intact having a smaller switching angle than hoist assemblies incorporating the configurations of FIGS. 8 and 9. Furthermore, the lengths of the arms and lift links could be changed or the hoist mechanism could be relocated on the chassis thereby to vary as desired the switching angle. Also, the size and shape of any or all of the brackets could be changed to accomplish this variation.

Once given the above disclosure, many other features, modifications, and improvements will become apparent to the skilled artisan. Such other features, modifications and improvements are, therefore, considered to be a part of this invention, the scope of which is to be determined by the following claims:

I claim:

1. A hoist mechanism for use in raising and lower a dump bed pivotally connected to a vehicle chassis, said hoist mechanism comprising:

a first and a second lifting arm connected at a first pivot point, said first lifting arm having a second pivot point at one end thereof, said second lifting arm having an engaging pivoting stop means located on one end thereof for increasing the effective length of said second lift arm when said second lift arm forms a predetermined angle with respect to said first lift arm; and an extensible and retractable hydraulic cylinder means connected to said second lifting arm;

said hydraulic cylinder means and said pivoting stop means being so arranged that upon initial extension of said cylinder means, said first lifting arm remains stationary relative to said second pivot point as said second lifting arm rotates around said first pivot point until said second lifting arm reaches said predetermined angle with respect to said first lifting arm, said pivoting stop means being so located that when said second lifting arm reaches said predetermined angle said second arm's effective length is increased and thereafter as said angle is exceeded said pivoting stop means causes said first lifting arm to rotate around said second pivot point upon further extension of said hydraulic cylinder means thereby to increase the rate of lifting of the dump bed relative to the amount of cylinder extension.

2. A hoist mechanism as defined in claim 1, wherein said pivoting stop means comprises a lift link having a first and a second pivot means rotatably attached thereto, said first pivot means also being rotatably attached to said second lifting arm, said second pivot means being rotatable attachable to a vehicle component,
said pivoting stop means being so constructed that said second lifting arm engages said second pivot means when said second lifting arm is at said predetermined angle with respect to said first lift arm.

3. A hoist mechanism as defined in claim 2 wherein said lift link is an elongated member.

4. A hoist mechanism as defined in claim 2 wherein said second pivot means is rotatably attached to said dump bed by a first bracket, said first bracket being fixably attached to said dump body.

5. A hoist mechanism as defined in claim 4 wherein said first bracket is of a shape such that it rests on said chassis when said hoist mechanism is inoperable.

6. A hoist mechanism as defined in claim 2 wherein said second pivot means comprises a first tube, and said second lifting arm has a saddle means so located and of a size and shape for receiving said tube when said predetermined angle is formed between the first lifting arm and the second lifting arm, thereby increasing the effective length of said second lifting arm.

7. A hoist mechanism as defined in claim 3 wherein said second therefor arm is approximately 4-6 times as long as said lift link.

8. A hoist mechanism as defined in claim 1 wherein said first and said second lifting arms are L-shaped.

9. A hoist mechanism as defined in claim 1 wherein said first and second lifting arms are approximately of equal length.

10. A hoist mechanism as defined in claim 1 wherein said hydraulic cylinder has an extendible rod protruding from one end thereof, said rod being attached to said second lifting arm.

11. A hoist mechanism as defined in claim 10 wherein said rod has located on one end thereof a crosshead member.

12. A hoist mechanism as defined in claim 11 wherein said crosshead member is comprised of two U-shaped plates fastened together having brace means between said plates.

13. A hoist mechanism as defined in claim 1 wherein said second pivot point is comprised of a bracket and a tube, said bracket being fixably attached to said chassis and rotatably attached to said tube.

14. A hoist mechanism as defined in claim 13 wherein said hydraulic cylinder is attached to said tube at the opposite end of said hydraulic cylinder from said extendible rod.

15. A hoist mechanism as defined in claim 1 wherein said first pivot point is comprised of a tube and a bracket.

16. A hoist mechanism as defined in claim 15 wherein said bracket is of a shape that engages said chassis when said hoist mechanism is inoperable and guides said hoist mechanism in place on said chassis as said hoist mechanism is retracted.

17. A hoist mechanism as defined in claim 1 wherein said hydraulic cylinder is connected to said second arm at a point in between said first pivot point and said pivoting stop means.

18. In the combination of a dump truck comprised of a dump bed pivotally connected to a truck chassis frame and wherein there is a hoist mechanism located between the dump bed and truck chassis frame for pivotally raising and lowering the dump bed with respect to the truck chassis frame, the improvement comprising, as said hoise mechanism, a first and a second lifting arm connected at a first pivot point, said first lifting arm having a second pivot point at one end thereof, said second lifting arm having an engaging pivoting stop means located on one end thereof for increasing the effective length of said second lift arm when said second lift arm forms a predetermined angle with respect to said first lift arm; and
an extensible and retractable hydraulic cylinder means connected to said second lifting arm;
said hydraulic cylinder means and said pivoting stop means being so arranged that upon initial extension of said cylinder means, said first lifting arm remains stationary relative to said second pivot point as said second lifting arm rotates around said first pivot point until said second lifting arm reaches said predetermined angle with respect to said first lifting arm,
said pivoting stop means being so located that when said second lifting arm reaches said predetermined angle said second arm's effective length is increased and thereafter as said angle is exceeded said pivoting stop means causes said first lifting arm to rotate around said second pivot point upon further extension of said hydraulic cylinder means thereby to increase the rate of lifting of the dump bed relative to the amount of cylinder extension.

19. The combination of claim 18 wherein said pivoting stop means comprises a lift link having a first and a second pivot means rotatably attached thereto, said first pivot means also being rotatably attached to said second lifting arm, said second pivot means being rotatably attached to said dump bed, said pivoting stop means being so constructed that said second lifting arm engages said second pivot means when said second lifting arm is at said predetermined angle with respect to said first lift arm.

20. The combination of claim 19 wherein said second pivot means comprises a first tube, and said second lifting arm has a saddle means located proximal an end thereof furtherest from said first pivot point, said saddle means being so located and of a size and shape for receiving said tube when said predetermined angle is formed between the first lifting arm and the second lifting arm, thereby increasing the effective length of said second lifting arm.

* * * * *